May 5, 1970  A. M. BEST  3,510,013
AUTOMATIC BALE LOADING AND UNLOADING WAGON
Filed May 20, 1968  2 Sheets-Sheet 1

INVENTOR.
ALBERT M. BEST
BY John E. Becker
ATTORNEY

May 5, 1970    A. M. BEST    3,510,013
AUTOMATIC BALE LOADING AND UNLOADING WAGON
Filed May 20, 1968    2 Sheets-Sheet 2
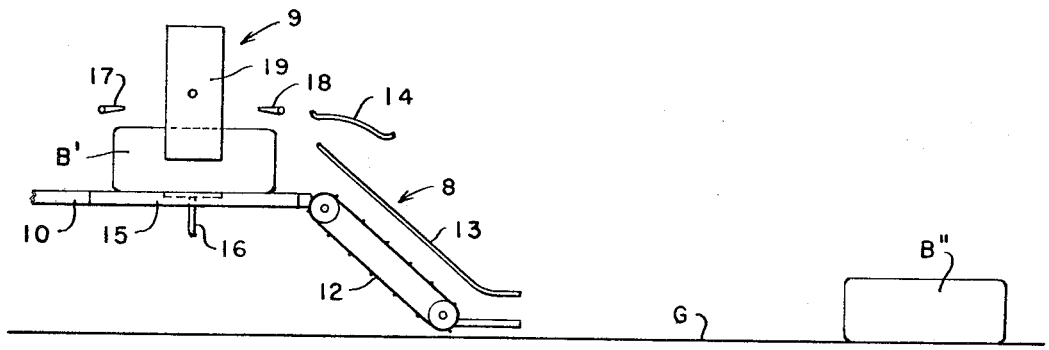
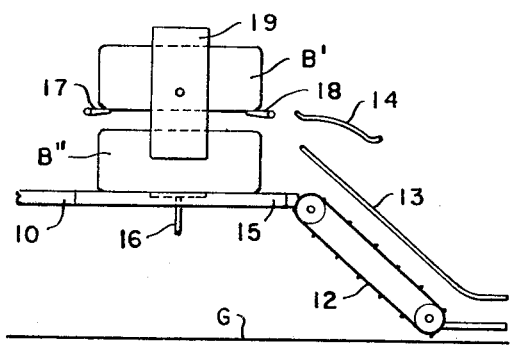
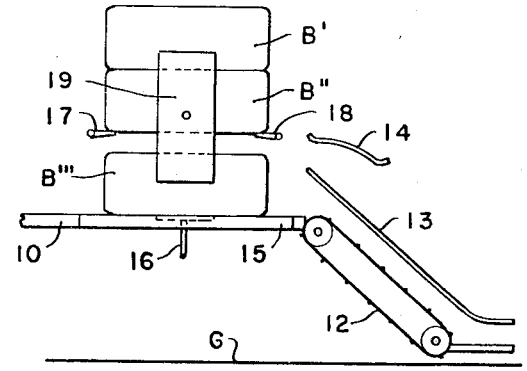
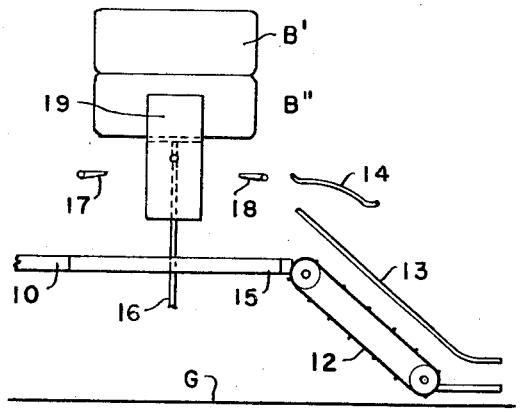
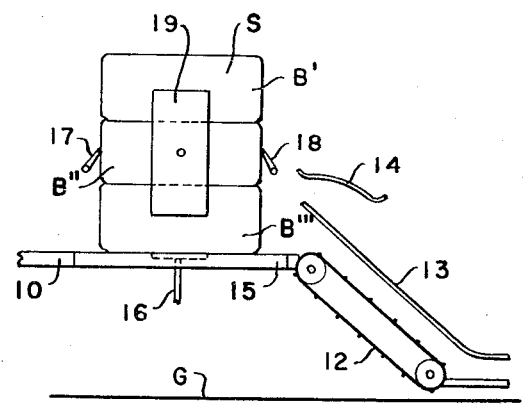
INVENTOR.
ALBERT M. BEST
BY
John E. Becker
ATTORNEY United States Patent Office 3,510,013
Patented May 5, 1970

3,510,013
AUTOMATIC BALE LOADING AND
UNLOADING WAGON
Albert M. Best, New Holland, Pa., assignor to Sperry
Rand Corporation, New Holland, Pa., a corporation
of Delaware
Filed May 20, 1968, Ser. No. 730,685
Int. Cl. B65g 57/32, 57/28, 59/12
U.S. Cl. 214—6                                    10 Claims

ABSTRACT OF THE DISCLOSURE

An automatic bale loading and unloading wagon comprised of a flat bed wagon having a vertical bale stacking means at the forward end thereof, a longitudinal main conveyor extending along the wagon bed, a transverse conveyor on the wagon bed adjacent the end of the main conveyor, and a discharge conveyor extending transversely of the wagon adjacent and below one end of the transverse conveyor so as to be able to discharge bales picked up and transported by the wagon one bale at a time.

Background of the invention

This invention relates generally to trucks and wagons, and more specifically to wagons designed to automatically pick up bales of hay from the ground where they have been previously deposited by a hay baler, to stack the bales on the wagon, to transport the bales and subsequently discharge the bales, one at a time, onto an elevator or the like to be placed in a barn.

A need for automatic loading and unloading wagons has long been recognized by farmers and farm machinery manufacturers alike. The eastern and midwest farmer unlike his western and southwestern counterparts, relies primarily on a protective enclosure, such as a barn or the like, for bale storage. The barn storage is necessary due to the damper climate, whereas the dry climate of the West and Southwest areas permits the farmer to store his hay bales in stacks outside without the need of protective cover.

Until recently, there has not been available to the farmer a bale wagon suitably adapted to provide automatic bale loading and unloading wherein the bales would be stacked in orderly fashion during the loading process so that an orderly unloading one at a time could also be accomplished. However, wagons have been provided with pivotal tables that periodically receive the bales and subsequently arrange them in stacks on a load-carrying bed, which when full, can be tipped or pivoted upwardly so that the bale load can be discharged as a composite stack. This arrangement is well suited to the western farmer, but it is necessary for the eastern farmer to manually feed the hay bales from the stack to his barn elevator intake for transport into his barn.

A problem is also encountered, when the farmer uses a bale wagon into which bales are thrown directly from a hay baler, by a bale thrower for example, since the helter-skelter arrangement of the bales precludes the use of automatic bale unloading equipment. Some unsuccessful attempts have been made to provide such automatic equipment for randomly loaded wagons.

In both cases described above, the efficiency and speed of the barn loading operation is limited, since it is necessary to have a man on hand to unload the bales from the wagon and get them into the barn.

Accordingly, the present invention will permit the farmer to have a fully automatic bale handling apparatus beginning with the formation during baling, to the unloading of the bales directly into an elevator chute one at a time. By the proposed arrangement, the farmer's total effort from the beginning of the baling operation to the final placement of the bales in the barn would be substantially decreased. Likewise, the number of persons previously necessary during the unloading operation is reduced, since the single unloading feature of the present invention is fully automatic.

Summary of the invention

The automatic hay bale loading and unloading wagon of the present invention utilizes a flat bed wagon, having an endless conveyor extending along the bed, a transverse conveyor also on the wagon bed, adjacent the main conveyor, a discharge conveyor adjacent one end of the transverse conveyor and extending angularly upward therefrom, and a vertical stacking means mounted forwardly on the wagon so as to permit vertical stacking of the bales picked up directly from the field, for transportation of the bales on the wagon after stacking and single bale discharge at a storage or unloading point.

In the drawings

FIGS. 4–8 are schematic views showing the bale loading sequences.

Figure 1:
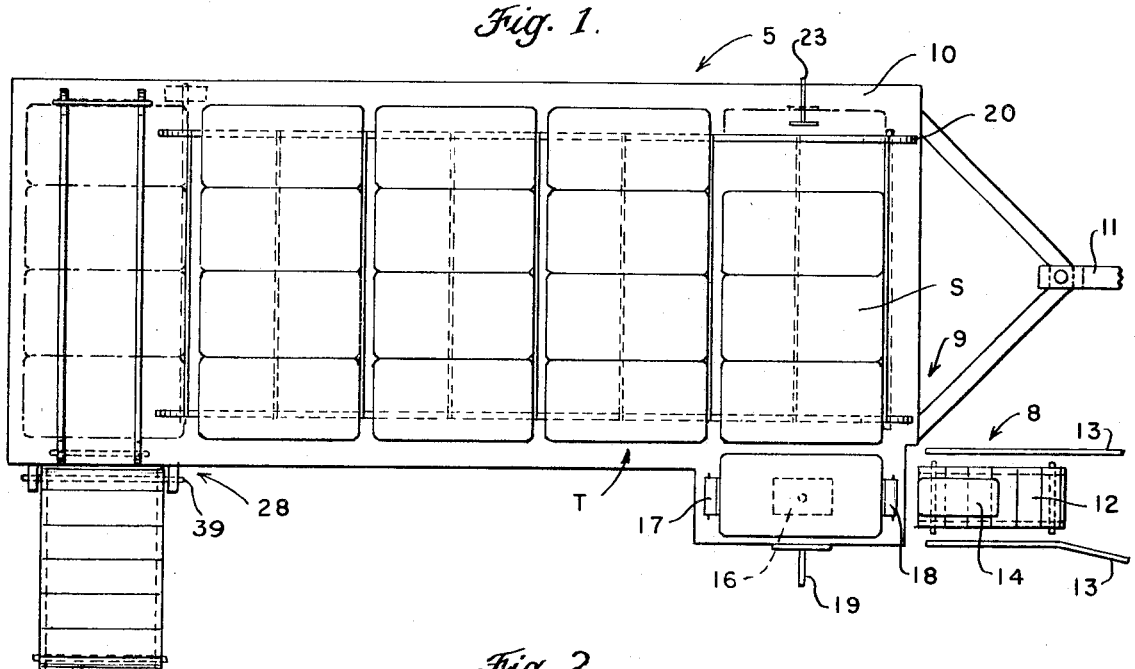
FIG. 1 is a generally schematic plan view of a bale wagon constructed according to this invention.
Figure 2:
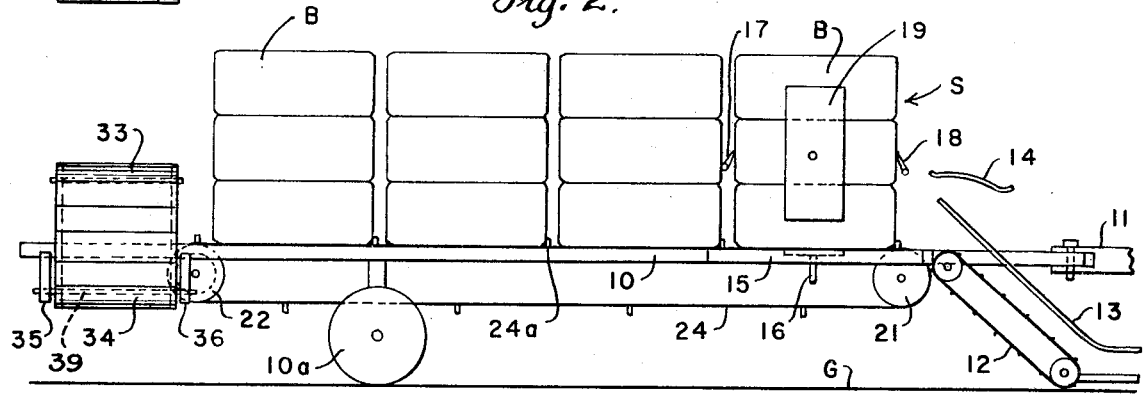
FIG. 2 is a side elevation of the wagon.

FIGS. 1 and 2 of the drawings disclose a flat bed bale wagon, generally designated as 5, comprised of a flat support bed portion 10 suitably mounted on a wheel and axle 10a and a suitable tongue portion 11, adapting the wagon to be connected to a tractor or other propelling implement (not shown). A bale pick-up means 8 is mounted forwardly of wagon 5 so as to be laterally offset from the bed portion 10. The pick-up means 8 is comprised of a pick-up conveyor 12, guide rails 13 and deflector plate 14.

The pick-up means, adapted to elevate bales from the ground and deliver them to the means for forming received bales into a tier comprising, a stacking means, generally indicated by the numeral 9, mounted on a bale receiving table 15 which is laterally offset from wagon bed 10 at the forward end thereof. Stacking means 9 includes a hydraulically actuated lift means 16, pivotal support gates 17 and 18, a hydraulically actuated plunger or pusher 19 and a mechanical trip device 23. The details of this structure may be similar to the stacking mechanism shown in U.S. patent application Ser. No. 596,314, filed Nov. 22, 1966, now abandoned.

A main endless conveyor means 20 extends in the fore-and-aft direction of the wagon forming a movable wagon bed over a substantial area thereof. The endless conveyor apron 20 is driven over sprockets 21 and 22 which are, in turn, drivingly connected to a conventional power source, such as a tractor power take-off unit (not shown).

The mechanical trip device 23 is mounted on the wagon, forwardly thereof, and is suitably connected by means (not shown) to a one revolution clutch 25, mounted rearwardly on the wagon bed 10 intermediate the ends thereof. The trip and the clutch device cooperate to cause a rotation of conveyor apron 20 in a rearward direction as will hereinafter be described in detail.

The apron 20 is provided with a plurality of divisions or flights 24 thereon. Each flight 24 is defined at either end by a raised element 24a which extends from side to side of the apron, and is adapted to receive a tier of hay bales B at the front of the wagon, which bales are directed to the bale wagon in a manner such that the longest dimension or longitudinal axis of a bale extends in a fore-and-aft direction.

Means 28, shown in FIG. 1, provided at the rearward end of wagon bed 10, are adapted to receive successive bale tiers T from the main conveyor 20 and unload the bales B from each tire, one bale at a time. Means 28 are comprised of a lateral conveyor 30 and a discharge conveyor 34 related in a manner as will hereinafter be described in detail.

Figure 3:
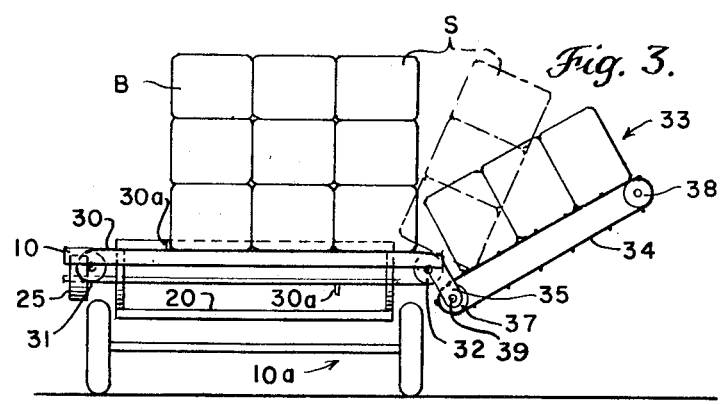
FIG. 3 is an end view of the bale wagon showing the unloading means associated with the wagon and illustrating how bales are removed from the wagon, a stack at a time and discharged one bale at a time.

Spaced rearwardly of the main conveyor 20 and adjacent thereto, is a lateral endless conveyor means 30 which is driven over sprockets 31 and 32, shown in FIG. 3. The lateral conveyor is provided with two flights defined by raised portions 30a and is driven by a suitable power source (not shown) in timed relation with the main conveyor so that one baler tier at a time will be moved from the main conveyor to the lateral conveyor.

Discharge means 33 is connected to the rearward portion of bale wagon as shown in FIGS. 1, 2 and 3. The discharge means 33 is comprised of an endless belt conveyor 34 which is driven by a suitable source (not shown) over sprockets 37 and 38. Spaced arms 35 and 36 are connected adjacent one end of bale wagon 10 and depend therefrom in an aligned relation with the end of transverse conveyor 30. The sprockets 37 are then rotatably secured between the depending arms 35 and 36 on a shaft or axle 39 so that the entire discharge means 33 is pivotally secured to the wagon relative to the bed 10 and lateral conveyor 30 between a transport position (not shown) and an outwardly extending operable position shown in FIG. 3. As shown in FIG. 3, the discharge means 33 extends at about a 30° angle relative to the horizontal and the lower end of conveyor 34 adjacent the wagon bed is below the level of the bed 10. Suitable structure such as chains, stops, links, or the like (not shown), is provided to keep the discharge means 33 supported in the operable position. By this arrangement, the bales will fall from tier T a stack S at a time, as indicated by the dished lines in FIG. 3.

Referring now to FIGS. 4–8, a wagon having a vertical stacking device 9 thereon approaches a plurality of bales (not shown), lying on the ground G after they have been dropped there by a baler. As a bale is encountered at the opening of the pick-up device 8, the bale is drawn upwardly between guides 13 by conveyor 12 onto bale receiving table 15, as shown by bale B' in FIG. 4. The wagon continues its forward progress toward the next bale B'', while at the same time elevator 16 lifts bale B' upwardly past pivotal gates 17 and 18. The gates are pivoted upwardly by the bale as it passes therebetween and after it passes the gates, they pivot back to a horizontal position. Elevator 16 is retracted so that the bale is supported by the gates above the table 15, as shown in FIG. 5.

Following the retraction of elevator 16, a second bale B'', seen in FIG. 5 is delivered to table 15 in a manner similar to the delivery of bale B' described above. Bale B'' is elevated, as shown in FIG. 6, so that both bales B' and B'' clear gates 17 and 18. Upon retraction of the elevator, both bales are supported above the table as shown.

Referring specifically to FIG. 7, a third bale B''' has been delivered to table 15 beneath bales B' and B''. If it is desired, the third bale may be lifted upwardly as have the first two bales so that three bales are supported above the gates. However, for the purposes of this description, only a three bale stack is shown, as in FIG. 8, and in this instance, the third, or bottom bale in the stack is not elevated. Once a desired stack S has been formed, the plunger or pusher device 19 is, either manually or automatically by means (not shown), actuated to force the bale stack S from the receiving table 15 onto main conveyor apron 20. The bales may be forced from the stacking mechanism by pusher 19 while the upper bales are elevated in the manner shown in FIG. 7, or the gates 17 and 18 may be rotated to lower the upper bale into contact with the lower bales before pusher 19 is activated, as shown in FIG. 8. A second bale stack is then formed in the same manner. The second bale stack is subsequently forced laterally of the conveyor, forcing the first stack over one position.

The stacking arrangement continues until a complete tier T of bale stacks S is achieved from one side of the wagon to the other. In FIG. 1, a tier of bales having four stacks is shown; but any number could be provided. At this point, the tier of bales extends across the wagon bed and is forced into engagement with trip means 23, as shown in FIG. 1. The trip 23 then causes engagement of the one revolution clutch 25 through means not shown so that the main conveyor apron 20 rotates rearwardly the distance of one flight 24. It will be understood that appropriate interlock means (not shown) will be provided between the trip means 23 and the one revolution clutch 25 so that the trip is disengaged upon formation of the last tier of bales to prevent the first formed tier of bales from being discharged over the end of the wagon. Such an interlock might be of the type shown in U.S. Pat. 3,330,424, to Grey et al., where a spring biased lever would be connected to the clutch to effect disengagement thereof. When the wagon has been completely filled in this manner, the bales are arranged in stacks and tiers as illustrated in FIG. 2. The wagon may then be transported to an unloading area. Although it is not shown in FIG. 2, the last tier of bales loaded on the wagon would rest on the transverse conveyor 30.

At the unloading area of the main conveyor 20, lateral conveyor 30 and discharge conveyor 34 are actuated. Manual means, not shown, is provided to actuate conveyor 20 to move each tier T of bales to conveyor 30. The transverse conveyor 30 is operable so as to receive one tier T of bales at a time from the main conveyor 20 and to deliver the tier transversely across the wagon bed to the discharge conveyor. Because of the height differential between the end of the lateral conveyor and the end of the discharge conveyor, a single bale stack S at a time is delivered from the transverse conveyor to discharge conveyor 34, as shown in FIG. 3. The speed of the discharge conveyor is such that the bale stack is discharged therefrom one bale at a time before the next bale is delivered thereto by the transverse conveyor. In this manner, the entire wagon is unloaded, one bale at a time, completely automatically.

While this invention has been described in connection with a particular embodiment thereof, it will be understood that it is capable of modification, and this application is intended to cover any variations, uses, or adaptations following, in general, the principles of the invention and including such departures from the disclosure as come within the known or customary practice in the art to which the invention pertains, and as fall within the scope of the invention.

Having thus described my invention, what I claim is:

1. An automatic bale loading and unloading wagon adapted for travel over a field with bales of crop material thereon comprising, in combination:
   a flat bale support bed on said wagon;
   bale pick-up means on said wagon;
   means on said wagon for receiving bales from said pick-up means and for forming them into uniformly vertically stacked tiers;
   means on said wagon for moving said tiers along said support bed;
   means on said wagon adjacent said tier moving means for receiving successive tiers and conveying said tiers laterally of said support bed; and
   a discharge means adjacent one end of said lateral conveying means for separating a stack of bales from a tier and for unloading said bales from said wagon, one bale at a time.

2. An automatic bale loading and unloading wagon adapted for travel over a field with bales thereon as described in claim 1, wherein said pick-up means is located at one end of said wagon.

3. An automatic bale loading and unloading wagon adapted for travel over a field with bales thereon as described in claim 1, wherein said pick-up means is laterally offset at the front end of said wagon.

4. An automatic bale loading and unloading wagon adapted for travel over a field with bales thereon as described in claim 1, wherein said means on said wagon for receiving bales from said pick-up means and for forming them into uniformly vertically stacked tiers is comprised of:
- a bale receiving table offset from said wagon at the forward end thereof;
- means on said receiving table for forming a vertical stack of bales from the bottom as successive bales are received from said pick-up means;
- means for moving each completed stack laterally of said wagon to form a tier of bales thereon, said bale tiers being arranged plural bales high and plural bales wide with the longitudinal axes of said bales extending in a fore-and-aft direction relative to ground travel; and
- means actuated by the completion of each tier for causing that tier to be moved rearwardly of said wagon.

5. An automatic bale loading and unloading wagon adapted for travel over a field with bales thereon as described in claim 1, wherein said means on said wagon for moving said tiers along said support bed is comprised of a conveyor means for moving said tiers rearwardly.

6. An automatic bale loading and unloading wagon adapted for travel over a field with bales thereon as described in claim 1, wherein said means on said wagon for moving said tiers along said support bed is comprised of:
- an endless member traversing substantially all of said support bed; and
- a plurality of flights spaced along said endless member, whereby a tier of bales is received between successive flights.

7. An automatic bale loading and unloading wagon adapted for travel over a field with bales thereon as described in claim 1, wherein:
said means on said wagon adjacent said tier moving means for receiving successive tiers and conveying said tiers laterally of said support bed to discharge means for unloading said bales from the wagon, one bale at a time is comprised of:
a lateral conveyor means on one end of said wagon; and said discharge means comprises:
- a discharge conveyor adjacent one end of and spaced below said lateral conveyor means for separating a stack of bales from a tier and unloading said bales from said wagon one bale at a time.

8. An automatic bale loading and unloading wagon adapted for travel over a field with bales thereon as described in claim 7, wherein said lateral conveyor means is comprised of:
- an endless member disposed rearwardly of said wagon; and
- a plurality of flights on said endless member, whereby a single tier is moved laterally from said wagon toward said discharge means.

9. An automatic bale loading and unloading wagon adapted for travel over a field with bales thereon as described in claim 1, wherein said discharge means is comprised of an endless conveying means having a plurality of flights thereon, adjacent one end of said lateral conveyor means.

10. An automatic bale loading and unloading wagon adapted for travel over a field with bales thereon as described in claim 9, wherein said conveying means includes an endless belt conveyor extending angularly outward from said wagon adjacent said lateral conveyor means, said discharge conveyor having an end adjacent said support bed below the level of said bed, whereby bales are separated from a tier and topple onto said conveying means one stack at a time and travel along said discharge conveyor for discharge one bale at a time.

References Cited

UNITED STATES PATENTS

| | | | |
|---|---|---|---|
| 2,847,110 | 8/1958 | Rysti | 214—8.5 X |
| 2,676,002 | 4/1954 | Wolfe | 214—519 X |
| 2,702,131 | 2/1955 | Leupke | 214—6 |
| 3,159,287 | 12/1964 | Stroup | 214—6 |
| 3,189,202 | 6/1965 | Hansen | 214—519 X |
| 3,214,050 | 10/1965 | McConeghy | 214—519 |
| 3,278,049 | 10/1966 | Hollyday | 214—518 X |
| 3,278,050 | 10/1966 | Tarbox | 214—6 |
| 3,385,456 | 5/1968 | Snider | 214—6 |

GERALD M. FORLENZA, Primary Examiner

R. J. SPAR, Assistant Examiner

U.S. Cl. X.R.

214— 8.5, 522